Patented Dec. 24, 1935

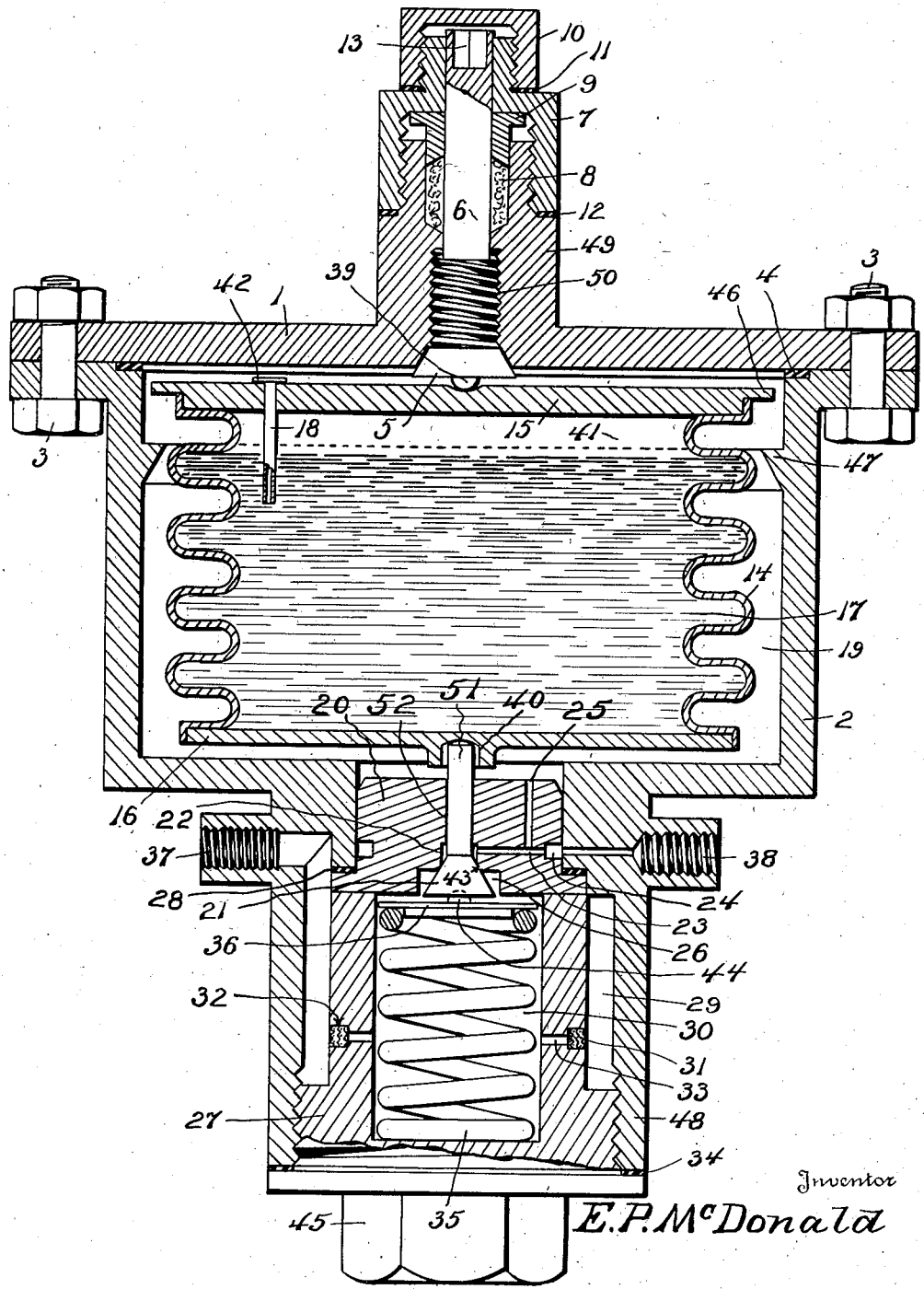

2,025,603

UNITED STATES PATENT OFFICE 2,025,603

PRESSURE CONTROL VALVE

Ernest Percy McDonald, Auburn, Ala.

Application July 12, 1934, Serial No. 734,839

4 Claims. (Cl. 50—23)

My invention relates to certain new and useful improvements in pressure control valves and it is especially designed to be used as an expansion valve in refrigerating systems of the compression type.

It primarily has for its object to provide a valve of the character stated in which a differential pressure control is provided for the valve, which valve is operated by a spring and a bellows.

Further, it is an object of the invention to provide such a valve with means whereby the bellows will be protected against collapsing beyond a predetermined degree.

Further, it is an object to provide an automatic valve of the character stated of a simple construction, one that is inexpensive to manufacture and one which will effectively serve its intended purposes.

Other objects will in part be obvious and in part be pointed out hereinafter.

To the attainment of the aforesaid objects and ends, the invention still further resides in the novel details of construction, combination and arrangement of parts, all of which will be first fully described in the following detailed description and then be particularly pointed out in the appended claims, reference being had to the accompanying drawing in which:—

The figure is a vertical central longitudinal section of a valve embodying my invention, parts being broken away.

In the drawing, 1 represents the cover or head of the cylindrical casing or body 2 which is provided with a reduced diameter downwardly extending portion or neck 48 to which reference will be made later. The head 1 is secured to the body 2 by means of bolts 3, there being a gasket 4 provided in order to make a gastight joint.

Extending upwardly from the cover 1 is a boss 49 which is bored and tapped as at 50 to receive the threaded portion of the adjusting screw 6, the latter having a valve head 5 to engage a valve seat 39 for purposes later to appear.

Secured onto the boss 49 is a packing nut 7 that forces the gland 9 to compress the packing 8, a gasket 12 being provided to effect a tight joint between the nut 7 and the boss 49.

Screwed onto a threaded extension of the packing nut 7 is a cap 10 which encloses the upper end of the screw 6, the latter having a socket 13 to receive a wrench for adjusting purposes. A gasket 11 is interposed between the cap 10 and the nut 7.

Within the chamber 19 of the boss 2 is the bellows 14. The bellows 14 is provided with upper and lower heads 15 and 16 respectively to which the bellows extremities are tightly sealed. As a part of my invention the bellows 14 is filled to a predetermined level with a liquid 17 that is of a low freezing point. The remainder of the space within the bellows is filled with gas 41, the volume of which depends on the desired sensitivity of the valve 21 and also on the desired working stroke of this valve, the gas serving as a cushion. As examples of the liquid that may be used I may mention glycerine and lubricating oil.

18 is a tube carried by the head 15 and projecting into the bellows 14 to a point below the liquid level. The tube 18 is soldered to the head 15 for convenience in injecting gas into the chamber 10 within the bellows and it also serves to prevent the escape of this gas while the cap 42 is being placed over the inlet of the tube and secured in sealing engagement with the head 15.

The neck 48 is of two diameters. Within the lesser diameter is located a flanged plug 20 that is provided with a passage 22—23 to an annular groove 24 with which the outlet duct 38 communicates. The entrance to the passage 22 is counterbored as at 26 for the purpose of providing means of obtaining the desired width of the seat 43 for the valve 21. A duct 25 effects communication between the passage 23 and the chamber 19 that surrounds the bellows. A gasket 28 is interposed between the flange of the plug 20 and its seat in the neck 48.

27 is a plug which is screwed into the lower end of the neck 48 and which is provided with a flange to seat against the edge of the neck 48, there being a gasket 34 imposed for sealing purposes. The plug 27 has a reduced cylindrical portion to leave a chamber 29 in the neck 48. It also has a nut head 45 to which a wrench may be applied for screwing and unscrewing the plug. The chamber 29 is in communication with inlet duct 37 of the valve. It also communicates with a chamber 30 located within the plug 27 through holes 33 which are protected by screens 31. The screens 31 are held in a suitable groove 32 in the reduced cylindrical portion of the plug 27. The inner end of the plug 27 engages the flange of the plug 20 so that when the plug 27 is screwed home the plug 20 will also be securely in place and the gasket 28 will seal the plug 27 so as to prevent communication between the chamber 29 and the passage 22—23 except when the valve 21 is open.

Within the chamber 30 is the valve closing spring 35 and spring cap 36, the latter having a ball 44 to engage a depression in the lower end of the valve 21. The valve 21 has a stem 51 guided in a hole 52 in the plug 20, the upper end of the stem 51 resting in a recess 40 in the lower head 16 of the "sylphon". The adjusting screw 6 has a ball 39 to engage in a depression in the head 15 of the bellows.

If desired, the head 15 may be provided with an annular stop flange 46 and the body 2 may be provided with an annular stop flange 47, the two flanges being spaced apart a predetermined distance equal to the safe movement of the bellows.

While these mechanical stops 46 and 47 may be employed as an auxiliary device, they are not absolutely necessary when the liquid 17 is used.

So far as described it will be noted that when it is desired to replace the packing 8 the adjusting screw 6 is turned up until the valve 5 is tightly seated, thus sealing off any possible escape of the vapor while repacking the gland. When it is desired to adjust the mechanism, the cap 10 is removed and a wrench is placed in the socket 13 to turn the adjusting screw 6 to the desired degree, after which the cap 10 is replaced.

Having once adjusted the device, the manner in which it operates is as follows:

The inlet 37 and the outlet 38 are connected in the refrigerant line. As the refrigerant flows from inlet 37 to outlet 38 (when the valve 21 is open) a portion of the refrigerant vapor passes through a passage 25 from the passage 23 into the chamber 19 where its pressure effects a compression of the bellows 14, thus allowing spring 35 to move valve 21 toward its seat and ultimately close off the flow of the refrigerant fluid from inlet 37 to outlet 38 when the pressure in chamber 19 reaches a predetermined degree.

By providing the liquid 17 and gas 41 it is obvious that the bellows may be compressed only against the cushion of the gas 41, the liquid 17, in cooperation with the compression of the gas 41, acting as a stop to limit the movements of the heads 15 and 16 respectively toward one another before the safe compression limit of the bellows is reached.

The stops 46 and 47 are principally used to protect the bellows by limiting the gas pressure within the bellows, caused by adjusting screw 6 to the position of the allowable working pressure of the bellows. The bellows, it will be seen, is automatically protected against any pressure around the outside by filling it with liquid and gas in such proportion that pressure inside the bellows will build up when the bellows collapses to approximately that on the outside, before it collapses beyond the allowable working stroke. By this means of protecting the bellows, the differential of pressure on both sides of the bellows under any conditions of pressure in the low pressure side will be approximately equal to that caused by the force of the spring 35 acting on valve 21. For this reason this type of valve may be used to control much higher pressures than those of the allowable working pressure.

The relative volume of gas and liquid will depend on the allowable working stroke of the bellows to prevent distortion of the metal, the desired working stroke of the valve and the sensitivity desired.

From the foregoing description, taken in connection with the accompanying drawing, it is thought that the complete construction, operation and advantages of the invention will be clear to those skilled in the art.

What I claim is:

1. In a device of the character described, a casing having a bellows chamber, a bellows in said chamber, said bellows including a flexible wall and rigid heads, an adjustable abutment against which one head continuously bears, a spring pressed member engaging the other head tending to compress the bellows, and means within said bellows by which a relatively small differential of pressure between the pressure within the bellows and the pressure outside the bellows and within said bellows chamber is maintained constantly under all operating conditions, said means comprising a liquid and a gas in such proportions that the stroke of the bellows is limited to that of the allowable working stroke under all working conditions.

2. In an automatic valve of the character described wherein is provided a casing having a bellows chamber and a bellows in said chamber; a neck projecting from said casing, said neck having a bore of two diameters, a flanged plug having a valve seat and held in the bore of lesser diameter, a plug having a threaded end and a cylindrical portion of lesser diameter than said threaded end inserted in said neck, said neck having a threaded portion to receive said threaded end, said last named plug having a spring pocket and having the inner end of its cylindrical portion engaged with said flanged plug to hold said flanged plug in place, said flanged plug having a passage in communication with said spring pocket and with the bellows chamber of said casing, said neck having an outlet with which said passage also communicates, said neck having an inlet in communication with the space between said neck and said cylindrical portion, said cylindrical portion having holes to effect communication between said inlet and said spring pocket, a valve having a stem projecting into the bellows chamber to engage the bellows therein, a spring in said pocket and a spring cap engaging said valve to seat it, substantially as and for the purposes described.

3. In an automatic device of the character described, a casing having a bellows chamber, a bellows in said chamber, said bellows having rigid heads, a spring pressed member engaging one of said heads and tending to compress the bellows, said casing having a boss, an adjusting screw mounted in said boss, said adjusting screw having a valve member at one end and said casing having a valve seat cooperating with said valve member, said adjusting screw having means for engaging the other head of said bellows as an abutment, a packing, a gland and a packing nut mounted on said boss and through which said adjusting screw projects, and a cap carried by said packing nut to enclose the projecting end of said adjusting screw, substantially as and for the purposes described.

4. In a device of the character described, a casing having an inlet and an outlet with a passage between the same and having a bellows chamber, a bellows in said chamber, said bellows including a flexible wall and rigid heads, an adjustable abutment against which one head continuously bears, a spring pressed member engaging the other head and constantly tending to compress the bellows and regulate the discharge through said outlet while in operation, and means within said bellows by which a relatively small differential of pressure between the interior of said bellows and the pressure outside the bellows within said bellows chamber is maintained constantly under all operating conditions present in said bellows chamber, said means comprising a non-volatile liquid and a gas, the relative weights of which remain practically constant under all operating conditions of temperature and pressure.

ERNEST PERCY McDONALD.